United States Patent Office 3,402,124
Patented Sept. 17, 1968

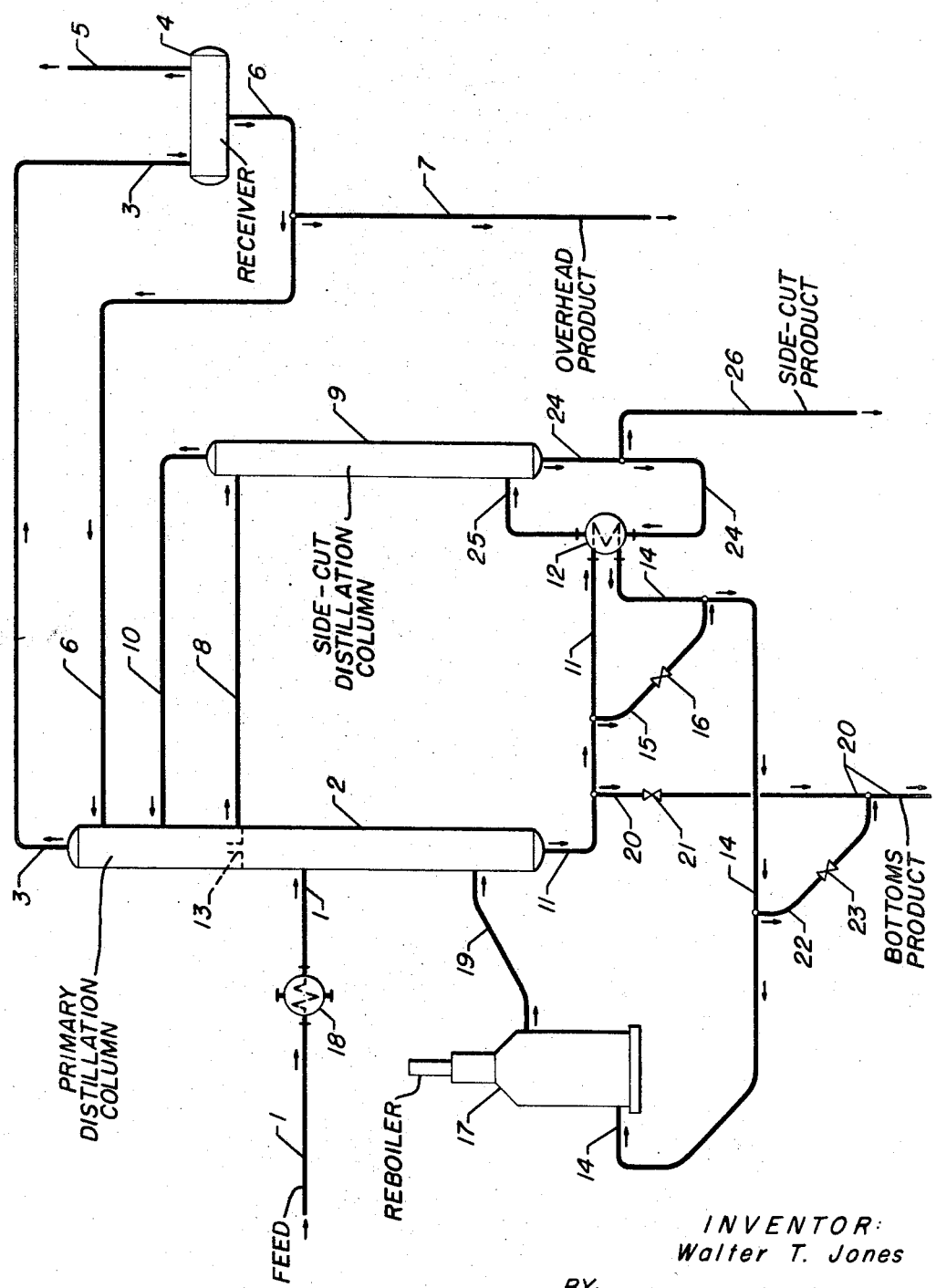

3,402,124
PLURAL STAGE DISTILLATION WITH BOTTOMS STREAM AND SIDE STREAM COLUMN HEAT EXCHANGE
Walter T. Jones, Des Plaines, Ill., assignor to Universal Oil Products Company, Des Plaines, Ill., a corporation of Delaware
Filed Mar. 16, 1966, Ser. No. 534,725
10 Claims. (Cl. 208—353)

ABSTRACT OF THE DISCLOSURE

Process for reboiling the side-cut stripping column on a main fractionator whereby the hot oil from the bottom of the main fractionator is circulated through the reboiler of the side-cut stripper to provide the heat required therein, then passed through the main fractionator reboiler means for reheating and finally returned to the bottom of the main fractionator.

---

The present invention relates to a process for the separation of organic chemicals by distillation. In particular, this invention relates to the distillation of a hydrocarbon mixture in a primary fractionation column to provide a selected side-cut fraction which is stripped of light components in a scondary column. Most specifically, the present invention affords a novel manner in which heat may be provided to the second distillation column from the first distillation column.

The general distillation scheme to which the present invention is an improvement is well known in the art of petroleum processing. When it is desired to remove one or more side-cuts from a wide boiling range charge stock, the stock is charged to a Primary Fractionation Column wherein the desired cuts are removed as liquids from intermediate collecting trays. Since such liquids are in equilibrium with the vapors above the trays, said liquids contain substantial amounts of lighter boiling components. These lighter components are removed by sending the liquid side-cuts to corresponding side-cut stripper columns, wherein the lighter components are stripped overhead and may be returned to the Primary Fractionator.

In some cases the required degree of stripping is accomplished by sparging live steam directly into the side-cut stripper. The disadvantage of this method is that by injecting open steam into the side-cut stripper the vapor loading in the column is increased corresponding to the rate at which open steam is introduced. Where the vapor is returned to the Primary Column, the vapor loading in the Primary Column is also increased by the amount of steam introduced therein. Therefore, the use of open steam stripping requires an increase in column diameters, vapor line sizes, and condenser sizes, and thus the capital and operating expenses are increased.

To overcome the handicaps resulting from open steam utilization, the stripping is often accomplished by reboiling the side-cut stripper using closed steam. In such a system the steam provides heat input sufficient to vaporize at least part of the heavy hydrocarbons in the reboiler, causing such vapors to flow up through the column and transfer heat to the lighter components at the top of the column. The heavier components are thereby condensed and remain in the side-cut stripper while the light component vapors are normally returned to the Primary Column. In many instances, however, the vapors to be stripped overhead are high-boiling and sufficient heat to effect such vaporization cannot be transferred by the use of steam.

Alternatively, it is common to provide the required reboiler heat by exchange with a hot hydrocarbon vapor or liquid which is provided from some other refinery unit. Thus, it is common for the hot effluent from a reactor section to provide the reboiler heat for fractionating columns or for hot hydrocarbon streams from a crude unit to provide heat for other refinery units. Although such exchange systems effectively conserve heat and accomplish the desired ends such practice has several deficiencies. The major draw-back in using such exchange is that the side-cut stripper becomes dependent upon its high temperature heat source. Thus, the Primary Column may be placed on-stream and the side-cut stripper may not go on-stream because the unit which provides its reboiler heat has not yet been placed in service. Similarly when the Primary Column and its side-cut stripper are on stream, any failure of the unit providing the reboiler heat exchange medium will cause a shut-down of the side-cut stripper. Another disadvantage of such a source of reboiler heat is that the unit providing such heat will rarely be in close proximity to the side-cut stripper. This requires that excessive lengths of high temperature piping be utilized in transferring the high temperature medium to the side-cut stripper reboiler thus adding capital expense to the unit.

To avoid the dependency of the side-cut stripper upon the operation of an external refining unit, it is possible to provide the necessary reboiler duty by charging the side-cut stripper bottoms to a direct fired furnace unit. Such a system has the disadvantage of requiring additional pumps and control instrumentation as well as the furnace heater. In some instances, the side-cut stripper reboiler duty may be provided by the installation of the necessary heating coils in an existing furnace unit, but this will often entail excessive length of piping in addition to the requirement of additional pumps and control instrumentation. In all events, the direct fired heating technique requires capital expense which exceeds that of other reboiling means.

It is therefore the object of this invention to provide an effective means of reboiling the side-cut stripper without entailing dependency upon an external processing unit. It is a further objective to provide the reboiling of the side-cut stripper with a minimum of capital expense. It is a more specific objective of the present invention to operate the Primary Column and the side-cut stripper as a cotmpletely integrated combination wherein the side-cut stripper reboiler duty is provided by the Primary Column.

Therefore, in accordance with the practice of this invention, a broad embodiment thereof consists of a process for separating materials by distillation means comprising a primary distillation column and a side-cut distillation column integrated therewith, each column having separate reboiler means wherein the improvement comprises passing at least a portion of the bottoms stream from the primary distillation column directly to said side-cut column reboiler means in an amount sufficient to constitute the primary heat source therein and subsequently passing at least a part of said portion of the primary column reboiler means and heating said part therein.

The present invention may be more clearly understood by reference to the sole figure which is a schematic drawing illustrating a broad embodiment thereof. Various pumps, heat exchangers, valves, control instruments, knock-out pots, minor vessels, auxiliary piping, etc. have been eliminated or greatly reduced in order to clarify the drawing and thus implement the complete understanding of the present process. The utilization of these and other miscellaneous appurtenances will immediately be recognized by one skilled in the art of hydrocarbon processing and it is not intended that such omissions in the drawing or in the following discussion will unduly limit the present invention to the particular embodiments contained therein.

Referring now to the sole figures, a hydrocarbon feed stock having a boiling range of about 124° F. to about 402° F. and a gravity of about 61° API is charged through line 1, wherein it is preheated in exchanger 18 to about 304° F., into a primary column 2 at the rate of 15,750 barrels per stream day (b.p.s.d.). A light hydrocarbon fraction is removed overhead as a vapor at about 170° F. via line 3 and upon cooling enters overhead receiver 4. Noncondensible gas and light hydrocarbon vapors leave receiver 4 via line 5 while the condensed light hydrocarbon fraction leaves the receiver via line 6 at a rate of 20,475 b.p.s.d. A part of this light hydrocarbon fraction amounting to 15,750 b.p.s.d. is returned to primary column 2 via line 6 as reflux while a net 4,725 b.p.s.d. is removed from line 6 via line 7 as a net overhead product. This net light fraction product has a boiling range of about 100° F. to about 200° F. and a gravity of about 80° API, and it may be sent to storage or it may be charged to some other processing unit. A heart-cut fraction leaves the primary column 2 as a liquid from a collection tray 13 therein, and at a temperature of about 300° F. passes through line 8 to the top of side-cut stripper column 9. Said heart-cut fraction is stripped of its lower boiling components which leave the side-cut stripper 9 as an intermediate vapor fraction at about 290° F. via line 10 and enter primary column 2 at a point above the heart-cut fraction withdrawal tray 13 but below the point at which reflux enters via line 6. The heavier components are removed from the bottom of side-cut stripper 9 as a liquid product fraction via line 24 at a temperature of about 304° F. and at a rate of 24,668 b.p.s.d. A net product fraction is withdrawn from line 24 at a rate of 9,828 b.p.s.d. via line 26. This product fraction having a boiling range of about 215° F. to about 325° F. and having a gravity of about 56° API may be cooled and sent to storage or it may be charged directly to another processing unit. The balance of the product fraction in line 24 now continues at a rate of 14,840 b.p.s.d. until it reaches the side-cut stripper reboiler 12 wherein its temperature is raised from about 304° F. to about 307° F. The reheated stream then leaves reboiler 12 via line 25 and re-enters the side-cut stripper 9. A heavy hydrocarbon fraction leaves primary column 2 at a rate of 34,969 b.p.s.d. via line 11 as a liquid having a temperature of about 442° F. A net heavy fraction is withdrawn from line 11 via line 20 and valve 21 at a rate of 1197 b.p.s.d. whereupon it may be cooled and sent to storage or charged to some other processing unit. This heavy fraction has a boiling range from about 340° F. to about 430° F. and a gravity of about 42° API. The balance of 33,772 b.p.s.d. of heavy fraction continues in line 11 until it is further reduced by a withdrawal of 3,377 b.p.s.d. via by-pass line 15 and control valve 16, whereupon a net 30,395 b.p.s.d. continues in line 11 and enters the side-cut stripper reboiler 12. The heavy fraction therein transfers heat to the side-cut stripper column 9 and the temperature of the heavy fraction is reduced from about 442° F. to about 420° F. The cooled heavy fraction leaves reboiler 12 in line 14 and is mixed with the liquid entering line 14 via by-pass line 15. The total heavy fraction now has a combined temperature of about 422° F. and it circulates via line 14 at a rate of 33,772 b.p.s.d. to furnace heater 17 wherein it is reboiled from about 422° F. to about 445° F. The reheated heavy fraction leaves the primary reboiler 17 via line 19 and enters primary column 2.

It can be seen from the foregoing illustration that the present invention affords a novel method for eliminating the disadvantages of the existing art as discussed hereinabove. It must be further noted that by completely integrating the side-cut stripper with the primary column in accordance wih this invention, the two columns will always operate in an effective thermal balance. Thus, if the boiling point of the heavy fraction has been reduced by a change in the feed stock composition, the temperature of the heavy fraction will still be high enough to reboil the side-cut stripper since the boiling range of the heart-cut fraction feeding the side-cut stripper will also have been inherently reduced. Other advantages of this combination process will be readily recognizable by those skilled in the art.

Although the foregoing example describes the present invention in one specific application thereof it is not intended to so limit the broadness of the invention. Thus, the charge stock of the illustration is a petroleum naphtha fraction, but any hydrocarbon fraction may be so processed ranging from a crude oil, a reduced crude oil, a gas oil, a lubricating oil, a kerosine, a gasoline, or any other combination of these or other hydrocarbon fractions. Further, it must be noted that the present invention is equally applicable to any distillable product mixture whether it be an organic chemical or an inorganic chemical. Thus, the process of the present invention may be applied to a fraction comprising a homologous series of alcohols or fatty acids, or to a mixture of alcohols and amines. Similarly, the illustrative example discusses the separation of a naphtha fraction under essentially atmospheric conditions, the primary column being operated at a bottom pressure of about 16 p.s.i.g. and the side-cut striper operating at about 15 p.s.i.g., but the present invention is equally effective at elevated pressure or under vacuum. The example also must not be construed to limit the present invention to only one sidecut stripper although such is the preferred embodiment, since multiple side-cut strippers, for example from one to three, may be reboiled by the primary column reboiler circulating line 11. Similarly, the example requires that only a portion of the heavy fraction be circulated through the side-cut reboiler, but all could be so circulated in which case valves 16 and 21 would remain closed and the net heavy fraction to be removed as a product would leave via line 22 through valve 23 and then exit via line 20. In a further modification, part of the heavy fraction in line 14 could by-pass reboiler heater 17 and be introduced as a quench or scrubbing stream into column 2. Other innovations, such as condensing the vapor in line 10 and returning it to the primary column 2 as a liquid reflux, are readily ascertainable by those skilled in the art but they nowise affect the broadness of the present invention.

The invention claimed is:

1. In a process for separating materials by distillation means comprising a primary distillation column and at least one side-cut distillation column fed by a side-cut fraction withdrawn from said primary distillation column, each column having separate reboiler means, the improvement which comprises passing at least a portion of the bottoms stream from the primary distillation column directly to at least one of said side-cut column reboiler means in an amount sufficient to constitute the primary heat source therein and subsequently passing at least a part of said portion to the primary column reboiler means and heating said part therein.

2. The process of claim 1 wherein the materials to be separated comprise hydrocarbons.

3. The process of claim 2 wherein said distillation means has from two to three side-cut distillation columns.

4. The process of claim 2 wherein said distillation means has one side-cut distillation column, and all of the bottoms stream from said primary column is passed through the side-cut column reboiler means.

5. Process for the separation of a feed stock by distillation means which comprises the steps of:
  (a) introducing said feed stock into a first distillation column wherein heat is supplied by a first reboiler means;
  (b) removing a first overhead stream from said first distillation column;
  (c) withdrawing a heart-cut fraction from said first distillation column;
  (d) introducing said heart-cut fraction into a second distillation column wherein heat is supplied by a second reboiler means;

(e) removing a second overhead stream from said second distillation column and returning said second overhead stream to said first distillation column;
(f) removing a product fraction from the bottom of said second distillation column, and reboiling at least a portion of said product fraction in the second reboiler means with a heating medium hereinafter specified;
(g) removing a heavy fraction from the bottom of the first distillation column and directly passing at least a portion of said heavy fraction through said second reboiler means as said heating medium specified;
(h) removing said portion of the heavy fraction from the second reboiler means, heating at least a part of said portion in the first reboiler means and returning it to said first distillation column;
(i) removing a net product comprising said heavy fraction;
(j) removing at least a portion of said bottoms product from the second distillation column.

6. The process of claim 5 wherein said second overhead stream is returned at a locus intermediate to the top and the bottom of the first distillation column.

7. The process of claim 5 wherein said feed stock comprises a hydrocarbon mixture.

8. The process of claim 7 wherein said feed stock comprises a naphtha fraction.

9. The process of claim 5 wherein all of said heavy fraction is passed through the high temperature side of said second reboiler means.

10. The process of claim 9 wherein at least a part of said heavy fraction is subsequently removed as a net product.

References Cited

UNITED STATES PATENTS

| | | | |
|---|---|---|---|
| 1,851,743 | 3/1932 | Wadsworth | 208—353 |
| 2,032,666 | 3/1936 | Roberts | 208—353 |
| 2,057,004 | 10/1936 | Burkhard | 208—353 |
| 2,073,953 | 3/1937 | Weir et al. | 196—134 |
| 2,717,232 | 9/1955 | Geller et al. | 202—154 |
| 2,954,341 | 9/1960 | Stiles | 203—27 |

FOREIGN PATENTS 239,208    1/1926    Great Britain.

WILBUR L. BASCOMB, JR., *Primary Examiner.*